Patented Nov. 5, 1935

2,019,840

UNITED STATES PATENT OFFICE 2,019,840

PROCESS OF PREPARING 1,4-DIHALOGEN-ANTHRAQUINONE-2-CARBOXYLIC ACIDS

Berthold Bienert, Leverkusen-I. G. Werk, and Robert Held, Leverkusen-Wiesdorf, Germany, assignors to General Aniline Works, Inc., New York, N. Y., a corporation of Delaware No Drawing. Application June 1, 1934, Serial No. 728,626. In Germany June 9, 1933

8 Claims. (Cl. 260—57)

The present invention relates to a process of preparing 1,4-dihalogen-anthraquinone-2-carboxylic acids.

We have found that 1,4-dihalogen-anthraquinone-2-carbonic acids can be obtained in an excellent yield and in a simple manner by causing ring-closing agents to react upon 2′,5′-dihalogen-benzophenone-2,4′-dicarboxylic acids at an elevated temperature of, for instance, 130–220° C. As ring-closing agents there can be used in the first line concentrated sulfuric acid or fuming sulfuric acid, it is to be understood, however, that other condensing agents known to promote anthraquinone ring formation of benzophenone-ortho-carboxylic acids can likewise be employed in the present process. As examples of ring-closing agents of the character described there may be mentioned:—chlorosulfonic acid or aluminium chloride, the latter being employed, if desired, in the presence of sodium chloride. Various substituents may be present in the benzene nuclei, care being taken, however, that the 6′-position is unsubstituted. It is pointed out that in the first line such substituents are contained in the nuclei which are usually present in anthraquinone derivatives. As examples for the substituents of the character described there may be mentioned alkoxy groups, halogen atoms and the like.

The 2′,5′-dihalogen-benzophenone-2,4′-dicarboxylic acids serving as starting materials in the present process can be prepared, for instance, by oxidizing 2′,5′-dihalogen-4′-alkyl-diphenylmethane-2-carboxylic acids by means of potassium permanganate in an alkaline solution.

We are aware of the fact that benzoyl-benzoic acids having a carboxylic acid group in 4′-position are capable of being converted into the corresponding anthraquinone derivatives by the action of ring-closing agents, however, it is well known in the art that the ring closing reaction encounters great difficulties if the Bz′-ring contains negative substituents. In accordance therewith it could not be foretold that the starting materials of the present process which are characterized by the presence of 2 halogen atoms besides a carboxylic acid group in the Bz′-ring are capable of being converted under relatively simple conditions into the corresponding anthraquinone derivatives. On the other hand, considering the fact that halogen atoms being in alpha-position of the anthraquinone nucleus are easily substituted by hydroxy groups if subjected to the action of hot sulfuric acid, it was to be expected that undesirable by-reactions would occur in the present process. Thus, the 1-hydroxy-4-chloro-anthraquinone-3-carboxylic acid if subjected to the action of sulfuric acid at 150–160° C. is easily converted into 1,4-dihydroxy-anthraquinone-3-carboxylic acid. It is obvious therefrom that it could not be foretold that anthraquinone ring-closure would occur in the present process under relatively mild conditions and that no by-reactions would take place.

The following examples will illustrate the invention, without, however, restricting it thereto, the parts being by weight:—

Example 1

1 part of 2′,5′-dichloro-benzophenone-2,4′-dicarboxylic acid is dissolved in 10 parts of sulfuric acid monohydrate and in the course of about 1 hour the amount of fuming sulfuric acid (20 per cent.) which is necessary for effecting the splitting off of water is caused to run in, the temperature being about 156° C. After some time, stirring at 156° C. the mixture is cooled down to 80° C. and the reaction product is precipitated by diluting the sulfuric acid to a content of about 80 per cent. The 1,4-dichloro-anthraquinone-2-carboxylic acid thus obtained is sucked off and washed with water. It represents pale yellow needles of a melting point of 238–242° C., the yield being 75–80 per cent. By recrystallizing from ortho-dichlorobenzene it is obtained in yellow crystals of a melting point of 244–246° C.

In the same manner and while observing the same conditions there can be used instead of 2′,5′-dichlorobenzophenone-2,4′-dicarboxylic acid such derivatives thereof as contain alkoxy groups, halogen atoms and the like in the benzene nucleus.

Example 2

1 part of 2′,5′-dibromobenzophenone-2,4′-dicarboxylic acid is dissolved in 10 parts of sulfuric acid monohydrate and in the course of about 40 minutes the amount of fuming sulfuric acid (20 per cent.) which is necessary for effecting the splitting off of water (it being preferable to employ an excess of about 10 per cent.) is caused to run in at 155–160° C. After 1 hour's stirring at 160° C. the mixture is allowed to cool. Upon diluting it with water to a content of sulfuric acid of about 80 per cent. the reaction product precipitates in form of yellow needles, which if recrystallized from nitrobenzene show a melting point of 241–242° C.

As described in Example 1, instead of 2′,5′-dibromobenzophenone-2,4′-dicarboxylic acid there can be used derivatives thereof which contain various substituents in the benzene nuclei.

We claim:—

1. The process which comprises causing ring-closing agents to react upon a 2′,5′-dihalogen-benzophenone-2,4′-dicarboxylic acid which has the 6′-position unsubstituted at elevated temperature.

2. The process which comprises causing ring-closing agents to react upon a 2′,5′-dihalogen-benzophenone-2,4′-dicarboxylic acid which has the 6′-position unsubstituted at a temperature of 130–220° C.

3. The process which comprises causing ring-closing agents to react upon 2′,5′-dichloro-benzophenone-2,4′-dicarboxylic acid at elevated temperature.

4. The process which comprises causing ring-closing agents to react upon 2′,5′-dichloro-benzophenone-2,4′-dicarboxylic acid at a temperature of 130–220° C.

5. The process which comprises causing a ring-closing agent selected from the group consisting of concentrated sulfuric acid, fuming sulfuric acid and chlorosulfonic acid, to react upon a 2′,5′-dihalogen-benzophenone-2,4′-dicarboxylic acid which has the 6′-position unsubstituted at elevated temperature.

6. The process which comprises causing a ring-closing agent selected from the group consisting of concentrated sulfuric acid, fuming sulfuric acid and chlorosulfonic acid, to react upon a 2′,5′-dihalogen-benzophenone-2,4′-dicarboxylic acid which has the 6′-position unsubstituted at a temperature of 130–220° C.

7. The process which comprises causing a ring-closing agent selected from the group consisting of concentrated sulfuric acid, fuming sulfuric acid and chlorosulfonic acid, to react upon 2′,5′-dichloro-benzophenone-2,4′-dicarboxylic acid at a temperature of 130–220° C.

8. The process which comprises causing a ring-closing agent selected from the group consisting of concentrated sulfuric acid, fuming sulfuric acid and chlorosulfonic acid to react upon 2′,5′-dibromo-benzophenone-2,4′-dicarboxylic acid at a temperature of 130–220° C.

BERTHOLD BIENERT.
ROBERT HELD.